United States Patent
Otsubo et al.

(10) Patent No.: US 6,537,832 B2
(45) Date of Patent: Mar. 25, 2003

(54) MEASURING APPARATUS AND FILM FORMATION METHOD

(75) Inventors: Toru Otsubo, Fujisawa (JP); Tatehito Usui, Chiyoda (JP)

(73) Assignee: Hitach, Ltd., Tokyo (JP)

( * ) Notice: Subject to any disclaimer, the term of this patent is extended or adjusted under 35 U.S.C. 154(b) by 0 days.

(21) Appl. No.: 09/844,629

(22) Filed: May 1, 2001

(65) Prior Publication Data

US 2002/0164829 A1 Nov. 7, 2002

(51) Int. Cl.[7] .......................... H01L 31/26; H01L 21/66
(52) U.S. Cl. ............................. 438/14; 438/16
(58) Field of Search ............................. 438/14, 16, 17, 438/18, 10; 356/318, 326, 328, 381, 382

(56) References Cited

U.S. PATENT DOCUMENTS 6,153,444 A * 11/2000 Nakano et al.
6,204,922 B1 * 3/2001 Chalmers

FOREIGN PATENT DOCUMENTS

| JP | A-7-4921 | * | 1/1995 |
| JP | A-8-292012 | * | 11/1996 |
| JP | A-10-111186 | * | 4/1998 |
| JP | A-11-153416 | * | 6/1999 |

* cited by examiner

Primary Examiner—David Nelms
Assistant Examiner—Phuc T. Dang
(74) Attorney, Agent, or Firm—Antonelli, Terry, Stout & Kraus, LLP

(57) ABSTRACT

A film formation monitor of a plasma CVD apparatus includes a light source for generating measuring light. Measuring light generated from the light source is guided to an optical system having lenses and mirrors, and is irradiated to a silicon substrate at a plurality of angles of incidence with the back of the silicon substrate being substantially a focus. Reflected light from the substrate is incident into a spectroscope. An intensity of measuring light is detected for each wavelength. A calculation apparatus calculates an etching depth. Reflected light from the back of the substrate interferes with reflected light from an etchd surface. To reduce influences of reflected light from the back of the substrate, measuring light is irradiated while its angle of incidence is varied.

18 Claims, 7 Drawing Sheets

MEASURING APPARATUS AND FILM FORMATION METHOD

BACKGROUND OF THE INVENTION

In producing devices by combining very fine thin film patterns such as semiconductor devices and liquid crystal display devices, this invention relates to a measuring/monitoring apparatus for measuring a film formation condition and a processing condition in a film formation processing for forming a thin film, a planarization processing for planarizing the resulting thin film, an etching processing for forming very fine patterns on the thin film, etc, a film thickness/etching depth measuring apparatus having the measuring/monitoring apparatus assembled therein, a measuring/monitoring method using these apparatuses, and a film formation/processing method.

In a film formation processing, a planarization processing and a very fine pattern formation processing that are employed for producing semiconductor devices or liquid crystal display devices, it is very important to precisely determine a change of a film thickness and a condition of progress of the very fine pattern formation processing, and to execute a series of processing as designed originally. An interference method that utilizes interference of light has been broadly used to measure a film thickness and a progress condition of a very fine pattern processing during these processing. JP-A-8-292012, for example, describes an etching end point detector that detects the end point of the very fine pattern formation by utilizing interference as a prior art technology.

JP-A-11-153416 discloses a method of measuring a thickness of a film formed on a substrate by interference. Also, JP-A-7-4921 discloses a method of measuring a film thickness in a planarization processing of a substrate surface. This reference describes measurement of a film thickness during polishing of a semiconductor wafer by the steps of irradiating measuring light having a wavelength that transmits through the substrate during the film thickness measurement, and measuring the thickness of a thin film on the basis of reflected light of measuring light that is reflected after transmitting through the substrate. Further, JP-A-10-111186 teaches to improve accuracy of temperature measurement by radiated infrared light by using a filter.

However, these prior art technologies are not yet free from the following problems. The etching end point detector disclosed in JP-A-8-292012 measures a surface condition of a processed substrate through a processing chamber. Since the condition inside the processing chamber and the condition of an inner wall surface of an inspection window for inspection change in the course of repetition of the processing, and this change affects the measurement result. In consequence, high precision measurement and monitoring are difficult.

The method of measuring the processing condition of the surface of the processed substrate from its back as described in JP-A-11-153416 and JP-A-7-4921 cannot easily detect with high accuracy reflected light from the substrate surface for measuring the condition of the substrate surface because the influences of reflected light from the substrate surface are great.

SUMMARY OF THE INVENTION

It is an object of the present invention to provide a measuring/monitoring apparatus capable of selectively detecting reflected light from a substrate surface for measuring the condition of the substrate surface, and capable of precisely measuring the condition of the substrate surface in order to measure a film thickness or an etching depth without influences of a processing condition and an internal condition of a processing chamber.

It is another object of the present invention to provide a film formation/etching measuring apparatus having a high precision measuring/monitoring apparatus of a substrate surface assembled therein, and a high precision film formation method by using such measuring/monitoring apparatuses. The present invention aims at accomplishing either of these objects.

To accomplish the objects described above, a first feature of the present invention resides in a measuring apparatus comprising irradiation means for irradiating measuring light from the back of a substrate in such a fashion that measuring light can be totally reflected from both first and second surfaces formed on the surface side of the substrate, and measurement means for causing reflected lights of measuring light irradiated by the irradiation means and reflected from the first and second surfaces to interfere with each other, and thus measuring a distance between the first and second surfaces.

A second feature of the present invention for accomplishing the objects described above resides in a measuring apparatus for measuring a film thickness of a film formed on a surface of a substrate or a depth of a processed surface processed on a substrate surface by optical interference means, comprising irradiation means capable of irradiating measuring light from the back of the substrate in such a fashion that measuring light is totally reflected from both an interface between a film formed on the substrate surface and the substrate and a processed surface of the substrate or a film surface, and measurement means for measuring a film thickness or a processing depth by causing reflected light from the interface and reflected light from the processing surface or the film surface to interfere with each other.

A third feature of the present invention for accomplishing the objects described above resides in a measuring apparatus for measuring a film thickness of a film formed on a surface of a substrate or a depth of a processed surface processed on a substrate surface by optical interference means, comprising irradiation means capable of irradiating measuring light from the back of the substrate in such a fashion that measuring light is totally reflected from both an interface between a film formed on the substrate surface and the substrate, and a processed surface of the substrate or a film surface, and measurement means for measuring a film thickness or a processing depth by causing reflected light from the interface and reflected light from the processing surface or the film surface to interfere with each other, wherein the irradiation means can irradiate irradiation light at different angles of incidence to the back of the substrate and can vary the angle of incidence of irradiation light so that an optical path difference of irradiation light transmitting through the substrate is greater than the wavelength of incident light, and an optical path difference due to the film thickness of the film or the processing depth as an object of measure is smaller than the wavelength of incident light.

A fourth feature of the present invention for accomplishing the objects described above resides in a measuring apparatus for measuring a film thickness of a film formed on a substrate surface by optical interference means, comprising means for irradiating from the back of the substrate both measuring light under a condition where measuring light is totally reflected on the surface of the film formed on the substrate surface, and measuring light under a condition where measuring light is totally reflected by an interface between the film and the substrate, and means for measuring the film thickness by causing reflected light from the surface of the film and reflected light from the interface between the film and the substrate to interfere with each other, and thus measuring the film thickness.

In each of the features described above, the irradiation means can irradiate measuring length having a plurality of measuring light, and the measurement means preferably measures the film thickness or the processing depth from the interference result for each wavelength.

A fifth feature of the present invention for accomplishing the objects described above resides in a thin film formation apparatus for forming a thin film on a substrate, comprising irradiation means for irradiating, from a back of a substrate, measuring light in such a fashion that measuring light is totally reflected by an interface between a film formed on a substrate surface and the substrate, measurement means for measuring a film thickness by causing reflected light from the interface and reflected light from a surface of the film to interfere with each other, and thus measuring the film thickness, and means for forming a thin film on the substrate by feeding back the film thickness measured by the measurement means.

A sixth feature of the present invention for accomplishing the objects described above resides in a processing apparatus of a substrate surface, comprising means for irradiating measuring light from a back of a substrate in such a fashion that measuring light is totally reflected from both substrate surface and processed surface of the substrate means for measuring a processing depth by causing reflected light from the substrate surface and reflected light from the processing surface to interfere with each other, and means for processing the substrate surface on the basis of the processing depth measured by the means for measuring the processing depth.

A seventh feature of the present invention for accomplishing the objects described above resides in a method of forming a thin film, comprising the steps of irradiating measuring light from a back of a substrate in such a fashion that measuring light is totally reflected from an interface between a film formed on a substrate surface and the substrate, causing reflected light from the interface and reflected light from the surface of the film to interfere with each other and thus measuring the film thickness, calculating a difference between the film thickness so measured and a target value of a film thickness set in advance, and controlling a processing condition of film formation on the basis of the difference.

An eighth feature of the present invention resides in a method of processing a substrate surface, comprising the steps of irradiating from a back of a substrate measuring light in such a fashion that reflecting light is totally reflected from both substrate surface and a processing surface formed on the same side as the substrate surface, causing reflected light from the substrate surface and reflected light from the processing surface to interfere with each other, and thus measuring a processing depth, calculating a difference between a processing depth so measured and a target value of a processing depth set in advance, and controlling a processing condition of the substrate surface on the basis of the difference.

A ninth feature of the present invention resides in an apparatus for measuring a temperature, including measurement means for measuring an intensity of infrared light irradiated, and measuring the intensity of infrared light radiated from the substrate to measure a temperature of the substrate, wherein the measurement range of infrared light by the measurement means for measuring the intensity of radiated infrared light is set to a region outside an optical path region through which radiated infrared light generated from a radiated infrared light generation range other than the substrate as a measurement object passes.

Owing to these features, the present invention can expel reaction products, whose adhesion amounts increase with repetition of processing, from the measurement region even when the change of the condition inside the processing chamber and the change of the condition of the inner wall surface of an inspection window for observation adversely affect the measurement result, and therefore can execute measurement and monitoring with high reproducibility. Measurement from the back of the substrate is conducted under the condition of the angle of incidence at which measuring light irradiated to the back is totally reflected on the substrate surface. In consequence, the intensity of reflected light from the back of the substrate can be improved, and measurement and monitoring can be conducted highly precisely. Further, the angle of incidence of measuring light irradiated to the back of the substrate is furnished with expansion, so that interference between reflected light from the back of the substrate and reflected light from the substrate surface can be reduced. Thus, the change of the interference intensity of reflected light from the back of the substrate can be measured and monitored highly precisely.

When the film thickness is measured, the expansion of the angle of incidence is controlled so as to control the proportion of reflected light from the film surface to reflected light from the interface between the film and the substrate, to thus optimize the interference intensity of reflected light and to conduct precise measurement and monitoring.

A detection mechanism for detecting infrared light radiated from the processing substrate is disposed in a region through which plasma and infrared ray radiated from the inner wall surface of the processing chamber do not optically transmit. Accordingly, measurement and monitoring can be precisely conducted. In film formation-, processing- and etching apparatuses having the measuring/monitoring apparatus assembled therein, the measuring/monitoring apparatuses for measuring from the back of the substrate are buried into a stage for placing the substrate so that a processing distribution of the substrate and its processing condition can be measured and monitored. The processing conditions are controlled on the basis of these results so that an optimum processing can be made.

DETAILED DESCRIPTION OF THE EMBODIMENTS

Figure 1:
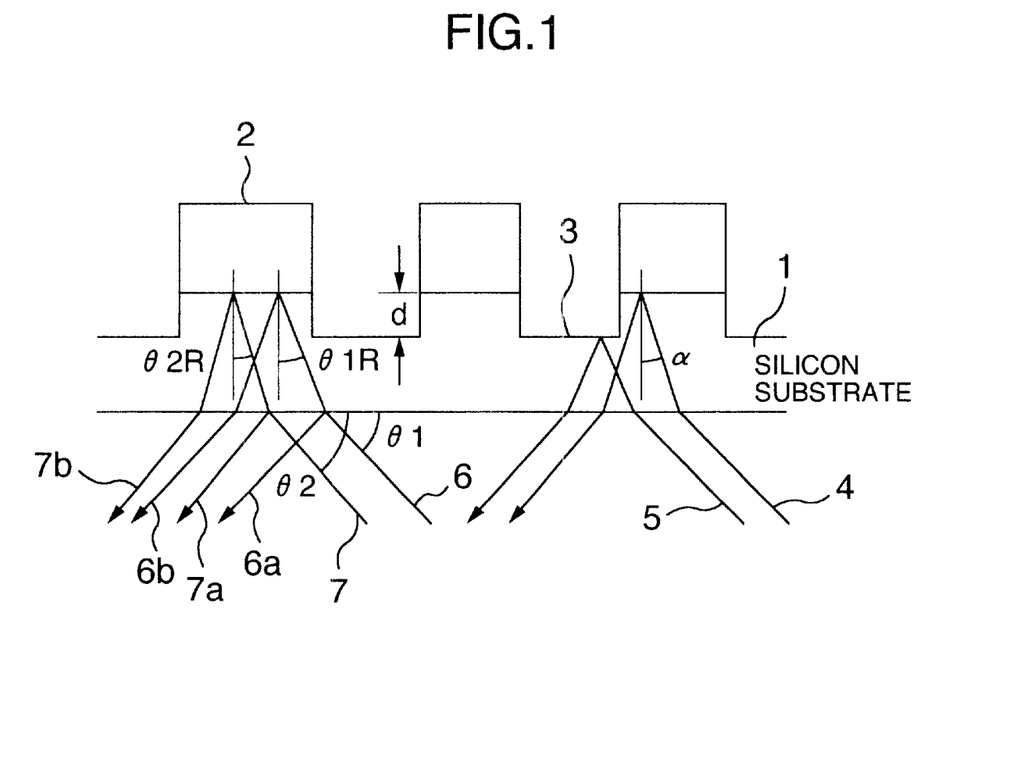
FIG. 1 in an explanatory view useful for explaining a measuring principle of an etching depth in the present invention.
Figure 2:
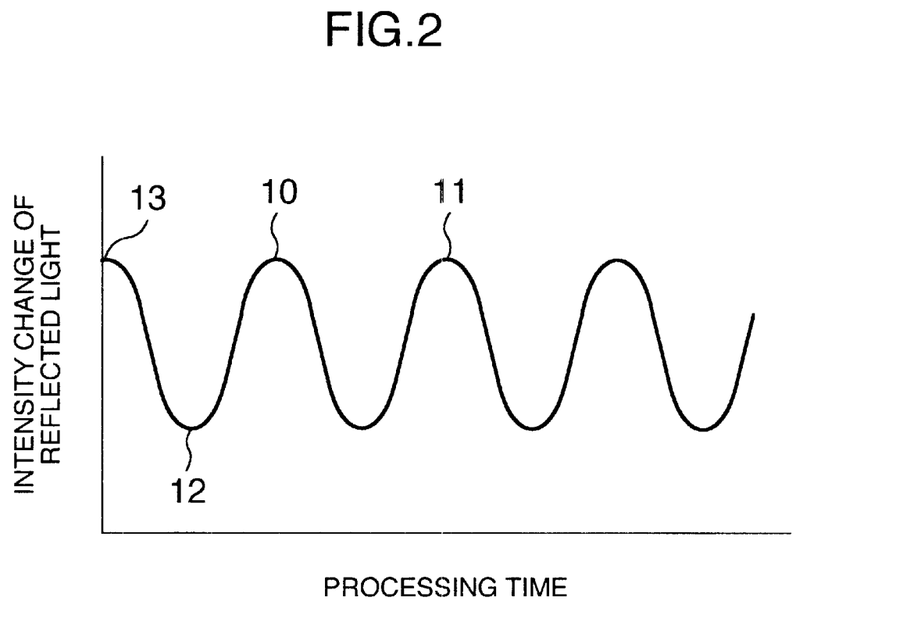
FIG. 2 is a diagram showing an example of a detection signal waveform measured on the basis of the principle shown in FIG. 1.
Figure 3:
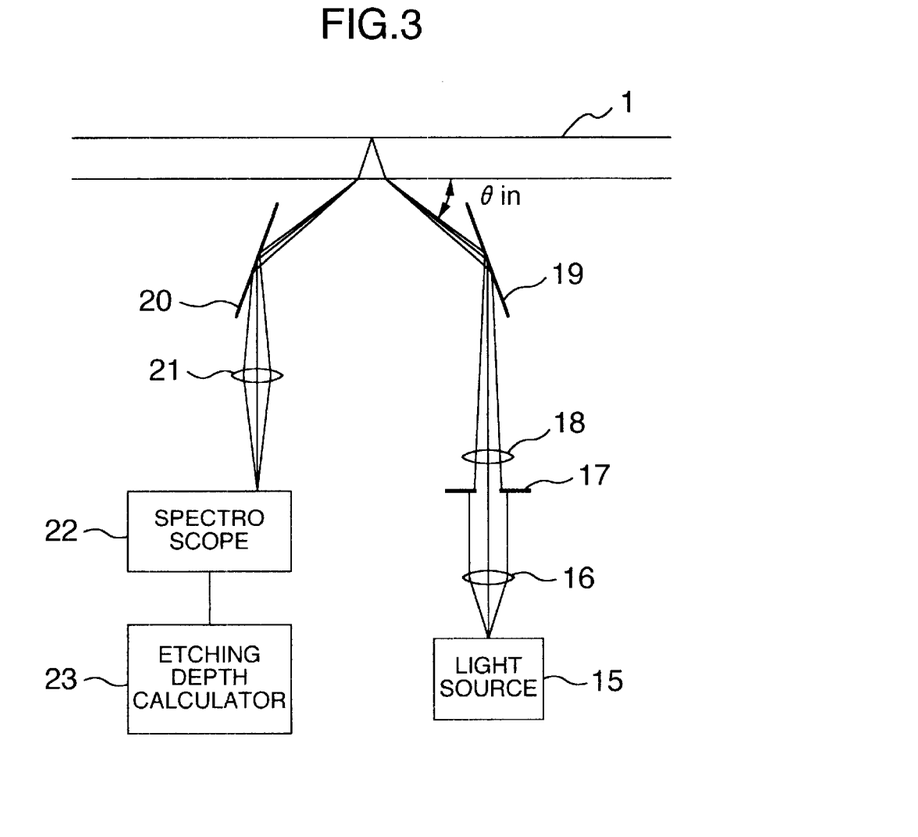
FIG. 3 is a schematic structural view showing an embodiment of an optical system of an etching depth measuring apparatus according to the present invention.

FIGS. 1 and 2 explain a basic principle of the present invention, and FIG. 3 is a schematic view showing an embodiment of an etching measuring apparatus according to the present invention. Referring initially to FIG. 1, a surface of a silicon substrate 1 is covered at some portions with a resist mask 2. Etching proceeds on a surface 3 of the silicon substrate 1 not covered with the resist mask 2.

Measuring light 4 is irradiated under a condition where it is totally reflected by an interface between the silicon substrate 1 and the resist mask 2. Measuring light 5 is irradiated at the same angle of incidence as that of measuring light 4 in such a fashion that it is totally reflected by the surface 3 of the silicon substrate 1. The interface with the silicon substrate surface 3 is an interface between the silicon substrate 1 and vacuum, and its refractive index is greater than that of the interface between the silicon substrate 1 and the resist mask 2. Therefore, measuring light irradiated from the side of the silicon substrate 1 is essentially reflected by the silicon substrate surface 3 provided that it is totally reflected at the interface between the silicon substrate 1 and the resist mask 2.

Here, it is assumed that a depth of the silicon substrate surface 3 (a thickness of the substrate 1 from the interface between the resist film 2 and the substrate 1 to the surface 3), in which etching proceeds, is "d", the refractive index of the silicon substrate 1 is "n", and an angle between a line perpendicular to the interface between the silicon substrate 1 and the resist film 2 (vacuum) and measuring light 4 (5) is $\alpha$. Then, a difference of optical length between the optical path of measuring light 4 and the optical path of measuring light 5 is $2dn/\cos \alpha$.

FIG. 2 is a graph showing the relation between a processing time when etching proceeds and a change of the intensity of reflected light due to interference, of reflected measuring light 4 and 5. The wavelength of measuring light 4 and 5 is assumed hereby to be $\lambda$. Under a condition where the difference of the optical length between the optical path of reflected light 4 and the optical path of measuring light 5 is some multiples of $\lambda$, the intensity of reflected light detected attains maximal values indicated by a peak 10 and a peak 11 in FIG. 2. When the difference of optical length between the optical path of measuring light 4 and the optical length of measuring light 5 is greater or smaller by $\lambda/2$ than some multiples of $\lambda$, the intensity of reflected light detected attains a minimal value indicated by a peak 12 in FIG. 2. Consequently, the etching depth d becomes $\lambda \cos \alpha/n$ between the minimal value and the maximal value adjacent to each other, and the etching depth d can be determined by discriminating the peaks of the intensity of reflected light from a point 13 at which etching is started.

When infrared light having a wavelength of 1.4 microns is used for measuring light, an etching amount between the maximal and minimal peaks is approximately 370 nm, the etching depth d can be obtained with accuracy of less than 100 nm by further dividing and discriminating the portion between the peaks by the change amount from the initial value of the intensity of reflected light provided that reproducibility of detection remains at a satisfactory level. Reflected light of measuring light irradiated to the back of the silicon substrate 1 includes not only reflected light from the silicon substrate surface 3 described previously but also reflected light from the back of the silicon substrate 1, and they also affect the change of the intensity of reflected light to be detected.

In the case of the silicon substrate 1, the quantity of reflected light from the back of the silicon substrate 1 is as great as 30% of the quantity of measuring light irradiated. This reflected light interferes with reflected light from the etching surface, inviting the change of the intensity of reflected light and its phase error with the progress of etching explained previously. In consequence, high precision detection of the etching depth d becomes difficult. To reduce the influences of reflected light from the back of the silicon substrate 1, therefore, the present invention sets the angles of incidence of measuring light 6 and measuring light 7 to mutually different angles $\theta1$ and $\theta2$ as shown in FIG. 1, and provides them with variance.

Assuming that the reflection angles of total reflection of measuring light 6 and measuring light 7 at each angle of incidence are $\theta1R$ and $\theta2R$ and the thickness of the silicon substrate 1 is dO, the difference of optical length of measuring light 6 and measuring light 7 can be expressed as $2dO(1/\cos \theta1R - 1/\cos \theta2R)$. The thickness of the silicon substrate 1 is generally at least 500 microns, and the difference of optical length is about 5 microns under the condition of variance of the angles of incidence where the influences on the etching depth measurement is within 0.01 microns at an etching depth of 1 micron.

When infrared light having a wavelength of 1.4 microns taken above as an example is used as measuring light, this value is about thrice the wavelength. This represents that reflected light 6b and 7b from the etching surface (the boundary surface between the resist mask 2 and the silicon substrate 1) are randomly deviated in phase within the range of $6\pi$, and the change of the intensity due to interference between these reflected light 6b and 7b can be reduced drastically. Accordingly, the change of the intensity of reflected light to be detected principally results from the interference between reflected light from the interface between the surface of the silicon substrate 1 and the resist mask 2 and reflected light from the surface 3 of the silicon substrate 1 on which etching proceeds, and high precision detection becomes possible.

Next, a measuring/monitoring apparatus constituted on the basis of the principle of the present invention described above will be explained with reference to FIG. 3. Referring to FIG. 3, a light source 15 generates infrared light having a wavelength of 1 micron to 3 microns. Light (measuring light) from the light source 15 is converted to substantially parallel beams by a lens 16, and is irradiated in such a fashion as to then pass through a stop 17 and a lens 18, be reflected by a mirror 19 and form a focus near the back of the silicon substrate 1. Reflected light of measuring light irradiated to, and reflected from, the silicon substrate 1 is reflected on the basis of the principle explained with reference to FIG. 1. Reflected light from the silicon substrate 1 is reflected by a mirror 20 and is incident into a spectroscope 22 through a lens 21. The spectroscope 22 detects the reflected light intensity of measuring light incident into the spectroscope 22 for each wavelength. The detection result of the spectroscope is fed to an etching depth calculator 23. The etching depth is calculated to determine an end point of etching.

Next, the operation of each part shown in FIG. 3 will be explained. The angle of the mirror 19 is adjusted so that the angle of incidence θ in of measuring light incident to the silicon substrate 1 is set to the condition of total reflection inclusive of an expansion angle of incident light at the interface between the surface of the silicon substrate 1 and the resist mask. The expansion angle of incident light with the angle of incidence being the center is adjusted by changing the beam diameter of irradiated light by means of the stop 17.

Figure 4:
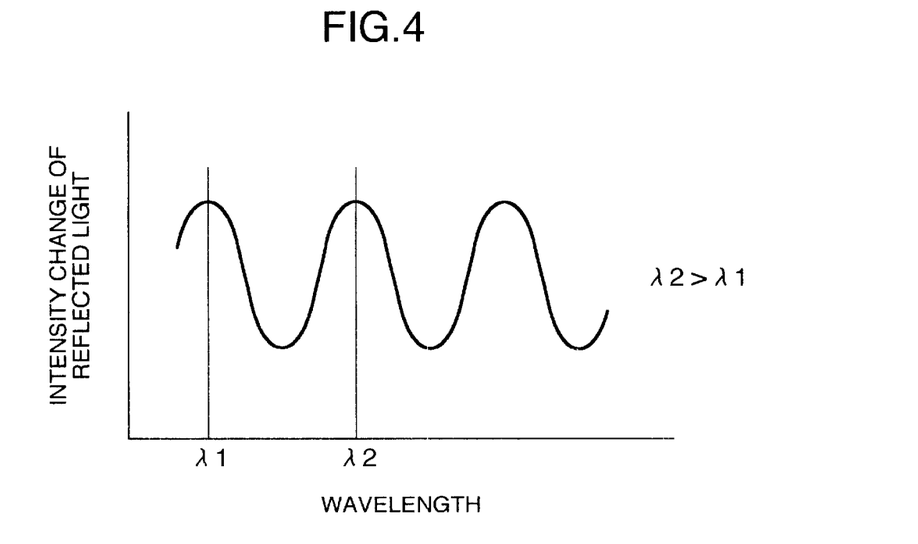
FIG. 4 is a diagram showing an example of a detection signal waveform detected by the apparatus shown in FIG. 3.

Reflected light from the silicon substrate 1 is reflected by the mirror 20 in such a fashion as to pass through the lens 21 and is condensed by the spectroscope 22. The spectroscope 22 measures the reflected light intensity for each wavelength as shown in FIG. 4. The explanation of the principle with reference to FIG. 1 explains the interference by a single wavelength. When light having a plurality of wavelengths is used, however, the same interference phenomenon occurs in light of each wavelength.

Since the principle of superposition holds of light, the interference condition of each wavelength can be measured as the spectroscope divides light into each wavelength.

The etching depth calculator 23 first determines the relation between the peak position of the reflected light intensity and the wavelength from the measurement result of the spectroscope shown in FIG. 4. Referring to FIG. 4, assuming that one peak has a wavelength λ1 and another peak adjacent to the former and having a greater wavelength has a wavelength λ2, a relation i*λ1=(i−1)*λ2 holds where "i" is an integer because the difference of the interfering optical paths is the same at each peak.

Therefore, i can be expressed by an integer that is most approximate to λ2/(λ2−λ1). Assuming that the angle at which measuring light is totally reflected on the surface of the silicon substrate 1 is α in the same way as in FIG. 1, the etching depth d can be determined from d=i*λ1*cos α/2.

Based on this equation d=i*λ1*cos α/2, the etching depth calculator 23 calculates the etching depth d.

When light of a plurality of wavelengths is used as in the embodiment described above, the absolute value of the etching depth d can be determined even under the condition where etching does not proceed but is at halt. Therefore, the set etching depth d can be measured more accurately than a system that uses a single wavelength.

This embodiment can implement a measuring/monitoring apparatus of a film thickness or an etching depth that can measure the film thickness and the etching depth without being affected by the progress condition of the processing and the condition inside the processing chamber, can selectively detect reflected light from the substrate surface to be measured, and can execute high precision measurement of the substrate surface.

Next, the second embodiment of the present invention will be described with reference to FIG. 5. A lens 26, a shading plate 27a, a shading plate 27b, a stop 28, a reflecting block 29 and a light projection/reception part 30 are assembled into a cylindrical holder 25. The reflecting block 29 is made of optical glass, and its inner surface is coated with a reflecting film. Light incident to this surface 29a is reflected from inside the reflecting block 29.

The lens 26, the shading plates 27a and 27b, the stop 28, the reflecting block 29 and the light projection/reception part 30 are constituted concentrically with the holder 25. The light projection/reception part 30 includes a light source 31, a spectroscope 33 and light guides 32 and 33. The light projection/reception part 30 is connected to the light source 1 and to the spectroscope 33 through the light guides 32 and 34 respectively, and can irradiate measuring light from the light source 31 from the light projection/reception part 30 into the cylindrical holder 25. At the same time, the light projection/reception part 30 transmits reflected light returning thereto from the cylindrical holder 25 to the spectroscope 33. The light source 31 can irradiate infrared light of 1 to 3 microns in the same way as in the embodiment shown in FIG. 3.

The lens 26 converts measuring light irradiated from the light projection/reception part 30 to an angle at which measuring light is slightly more condensed than parallel beams. Next, the shading plates 27a and 27b and the stop 28 create a ring-like beam represented by a ring-like optical path 35 the width of which becomes progressively smaller. This ring-like beam 35 enters the reflecting block 29, is reflected from the reflection surface 29a and is thereafter incident into the silicon substrate 1.

The angle of incidence into the silicon substrate 1 can be set by means of the angle adjustment of the reflection surface 29a. In this embodiment, the substrate as the measurement object is limited to the silicon substrate 1 and the angle of incidence of measuring light to the silicon substrate 1 is kept fixed. Expansion of the angle of incidence of measuring light is adjusted by adjusting the position of the lens 26, the shading plates 27a and 27b and the size of the stop 28, that together create the ring-like beam, and the proportion of the change of the width of the ring-like beam.

After the angle of incidence and its expansion are adjusted, measuring light is irradiated to the silicon substrate 1. Reflected light travels in the route opposite to that of incident light, is incident into the light projection/reception part 30 and is transmitted to the spectroscope 33. The subsequent calculation method of the etching depth d is the same as that of the first embodiment. Incidentally, the measuring system and the interior of the processing chamber are vacuum sealed by an O-ring 36 interposed between the reflecting block 29 and the holder 25 and an O-ring, not shown, interposed round the outer periphery of the holder 25.

Figure 6:
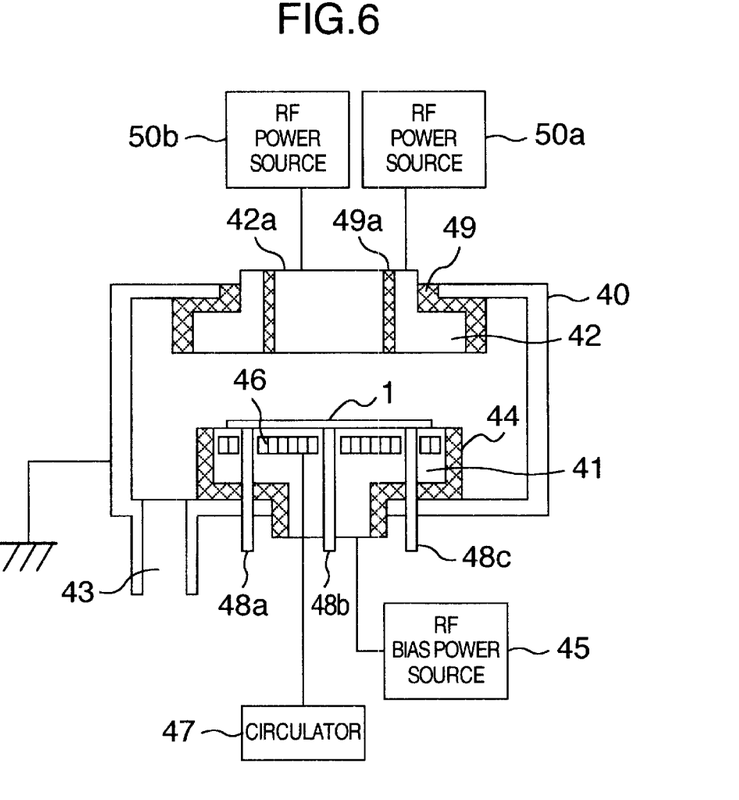
FIG. 6 is a structural view showing a section of an etching apparatus having the etching depth measuring apparatus shown in FIG. 5 assembled therein.

The etching apparatus and the etching method of this embodiment will be explained with reference to FIG. 6. A stage electrode 41 and an opposing electrode 42 are disposed inside a processing chamber 40. After the silicon substrate 1 is located on the stage electrode 41, etching is conducted. The stage electrode 41 is electrically insulated from the bottom and the sidewall of the processing chamber 40 by an insulating plate 44, and is electrically connected to a radio frequency (RF) bias power source 45 of 800 kHz. A flow path 46 is defined inside the stage electrode 41 to pass a coolant for cooling. The coolant the temperature of which is controlled by a circulator 47 is caused to flow through the flow path 46.

Figure 5:
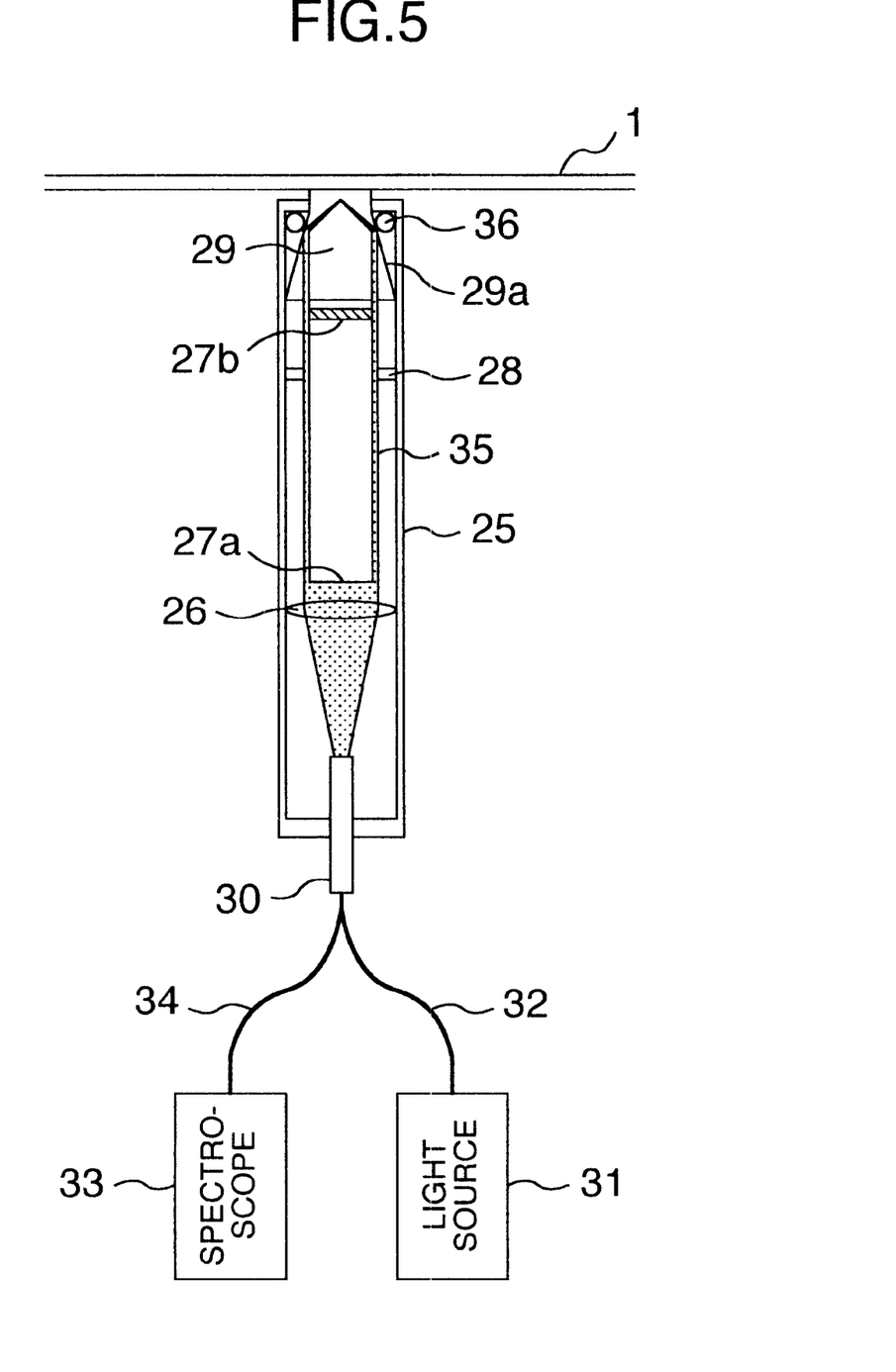
FIG. 5 is a schematic structural view showing a second embodiment of the etching depth measuring apparatus according to the present invention.

Besides monitors 48a, 48b and 48c shown in FIG. 5 and two more, not shown, or five monitors in total, are assembled at four positions of the outer periphery and one at the center inside the stage electrode 41. The monitors thus assembled are sealed by the O-rings as explained in the second embodiment to prevent leak of the coolant from the flow path 46 and from outside the processing chamber. An electrostatic suction mechanism, not shown, is provided to the surface of the stage electrode 41 to adsorb the silicon substrate 1. A helium gas is filled between the silicon substrate 1 and the stage electrode 41 to precisely control the temperature of the silicon substrate 1.

An insulating plate 49 electrically insulates the opposing electrode 42 from the upper surface and the sidewall of the processing chamber 40. A center part 42a of the opposing electrode 42 is electrically insulated from the outer peripheral part of the opposing electrode 42 by an insulating plate 49a. A radio frequency (RF) power source 50b of 68 MHz is connected to the outer peripheral part of the opposing electrode 42. A radio frequency power source 50b of 40 MHz is connected to the center part 42a. The opposing electrode 42 includes an etching gas feed part, not shown. While a set amount of the etching gas is allowed to flow, exhaust is conducted from an exhaust port 43 to keep the interior of the processing chamber 40 at a set pressure.

The etching gas is caused to flow at a set flow rate into the processing chamber 40 to establish the set pressure. After the temperature of the silicon substrate 1 is set to the set temperature, set radio frequency power is supplied from the radio frequency power sources 50a and 50b. Plasma is generated between the stage electrode 41 and the opposing electrode 42, and while set radio frequency bias power is supplied from the radio frequency bias power source 45, etching is started.

The monitors 48a to 48c and other two measure the etching depth d at five positions of the silicon substrate 1. An etching rate is calculated from etching distribution and the time change of the etching depth d. When the etching distribution and the etching rate deviate from the respective set values, a power ratio of the radio frequency power sources 50a and 50b and the power level are controlled so that the etching distribution and the etching rate fall within the respective set ranges.

As described above, because the stage electrode 41 for arranging the processing substrate 1 includes a plurality of measuring/monitoring apparatuses, the etching distribution and the etching rate can be monitored. Control can also be made on the basis of the monitoring result so that etching can be completed with the set target range. The end point of etching can be detected highly precisely, and etching can be conducted with high reproducibility.

The measuring/monitoring apparatus according to this embodiment is built in the stage electrode 41, and its measurement surface is covered with the processed substrate 1 during etching. A clean helium gas is filled between the processed substrate 1 and the stage electrode 41. Consequently, a reaction product formed by the plasma during processing does not adhere to the measurement surface of the measuring/monitoring apparatus, and monitoring can be stably made for a long time. An open portion for measurement need not be formed in the opposing electrode 42, and processing can be stably conducted without the occurrence of dust and abnormal discharge at the open portion.

This embodiment measures totally reflected light. Since the plasma and infrared light from the opposing electrode 42 do not enter the total reflection optical path, the influences of these external disturbing light are small and high precision measurement can be made. The portions that are to be assembled into the stage electrode 41 are only the optical system, and measurement is not affected by the radio frequency bias, and the like.

Figure 7:
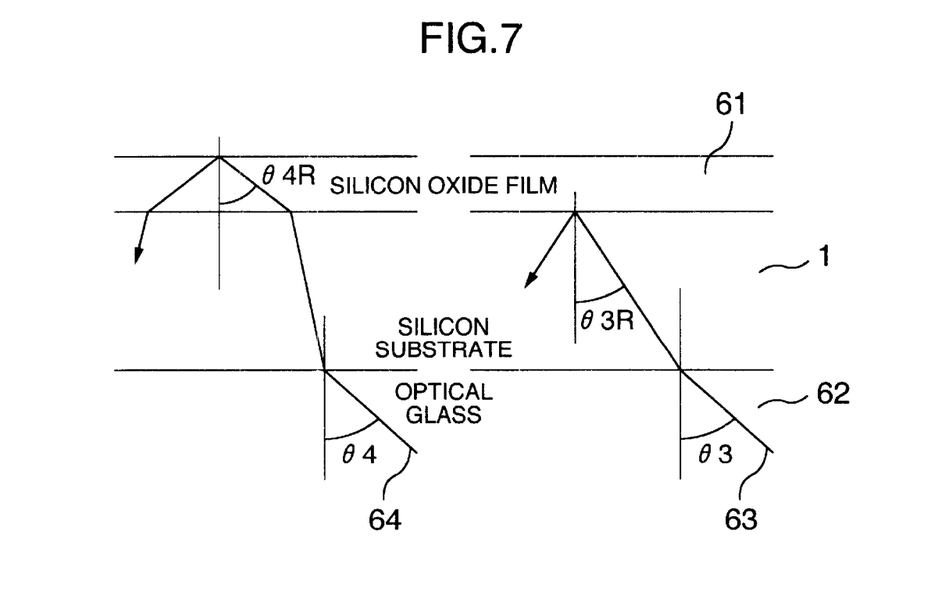
FIG. 7 is an explanatory view useful for explaining a principle of film thickness measurement according to the present invention.
Figure 8:
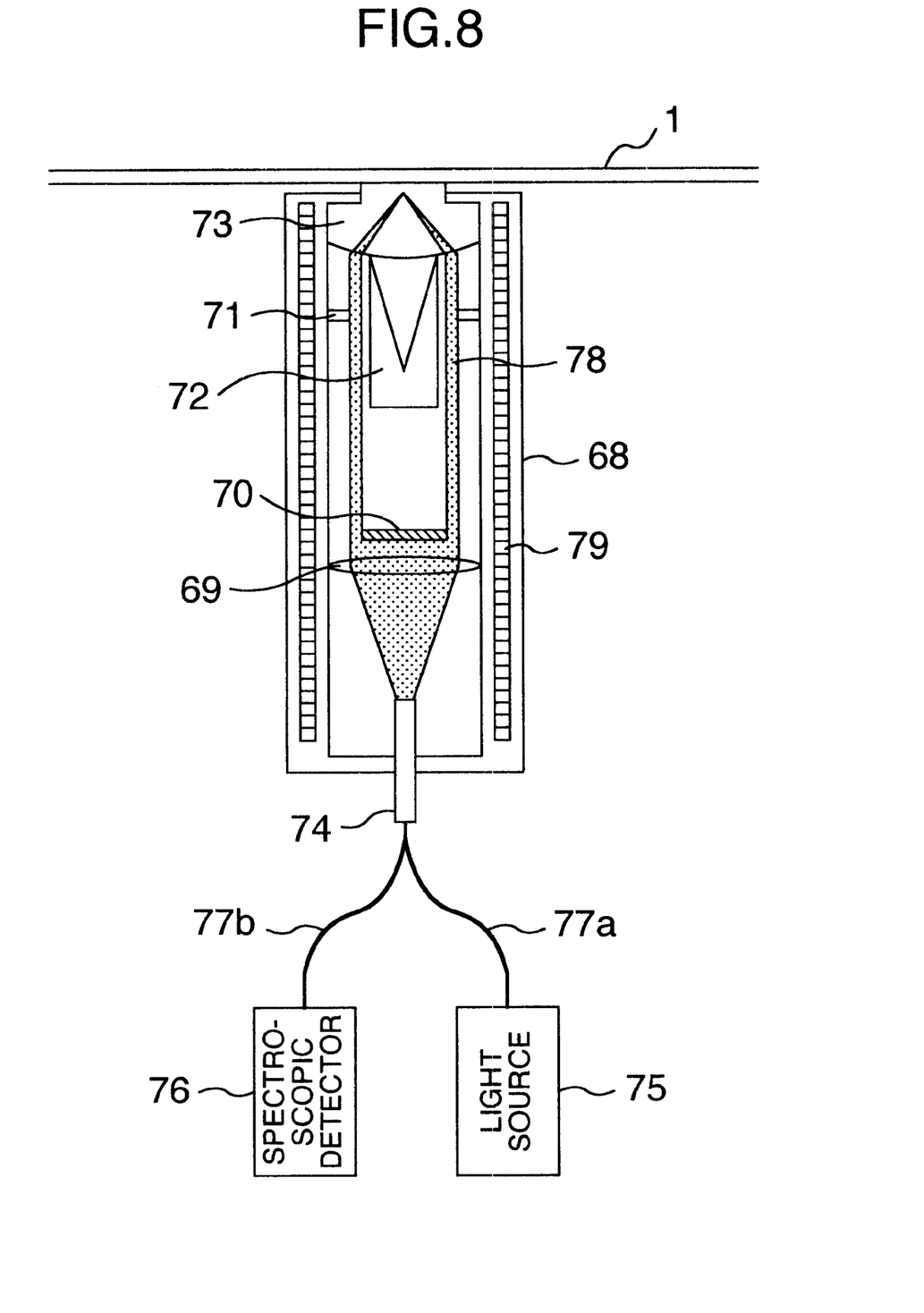
FIG. 8 is a schematic structural view of a third embodiment of a film thickness measuring apparatus and a substrate temperature measuring apparatus according to the present invention.
Figure 9:
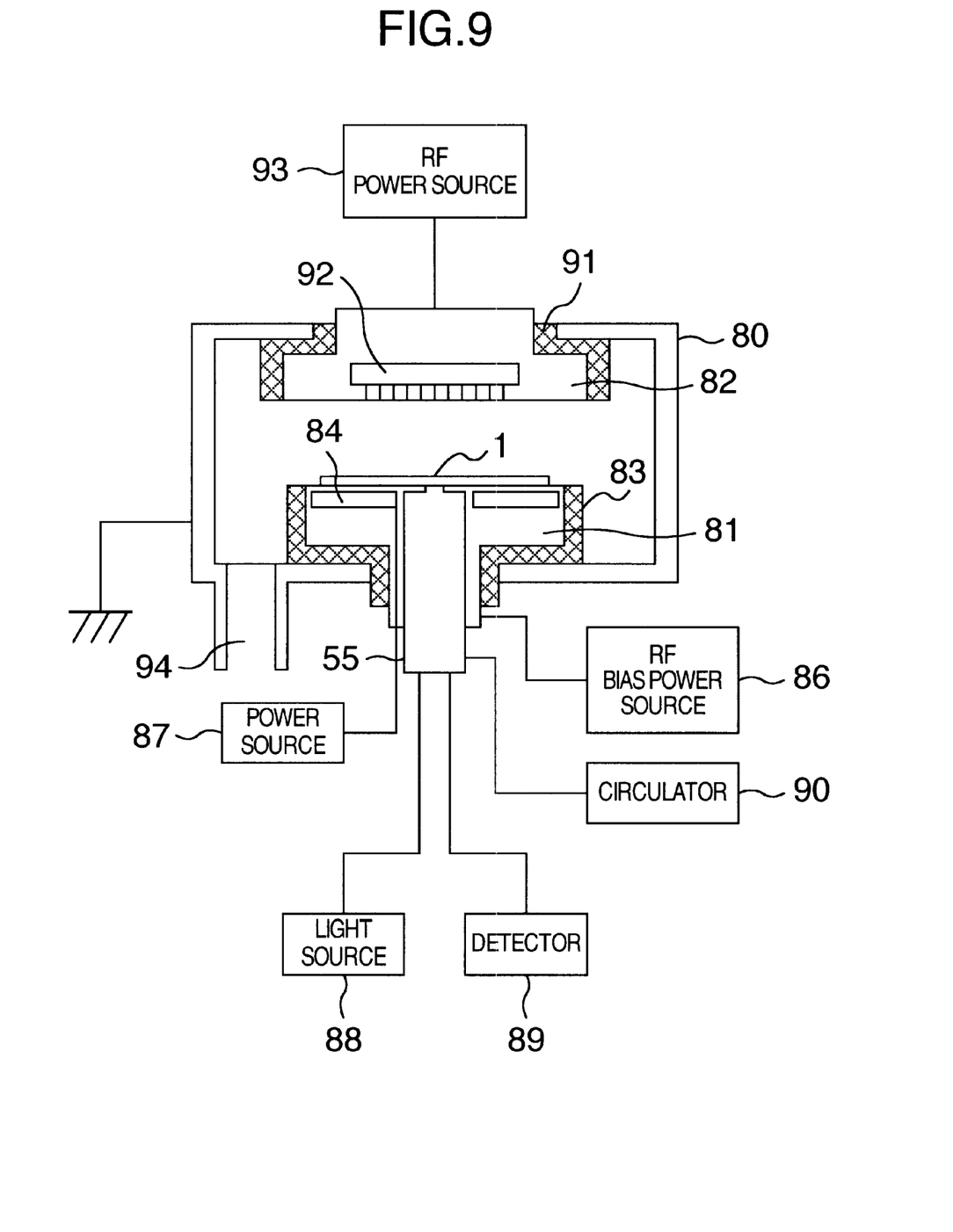
FIG. 9 is a structural view showing a section of a CVD apparatus having the film thickness measuring apparatus shown in FIG. 8 assembled therein.

Next, the principle of film thickness measurement in the film formation processing will be described with reference to FIG. 7. FIG. 8 shows the third embodiment of the present invention based on this principle, and FIG. 9 shows an example of a CVD apparatus having monitor devices assembled therein. FIG. 7 shows a condition where a silicon oxide film 61 is formed on the surface of the silicon substrate 1. An optical glass block 62 for measurement is disposed below the silicon substrate 1 while keeping close contact with the silicon substrate 1. To measure the film thickness, it is necessary to allow measuring light reflected from the interface between the silicon substrate 1 and the silicon oxide film 61 and measuring light reflected from the interface between the silicon oxide film 61 and the interior of the processing chamber, in which the film formation proceeds, to interfere with each other.

It is assumed hereby that the silicon substrate 1 has a refractive index of 3.5, the silicon oxide film 61 has a refractive index of 1.5 and the optical glass block 62 has a refractive index of 1.7. An angle θ3R at which total reflection of measuring light starts occurring on the interface between the silicon substrate 1 and the silicon oxide 61 is about 25° and the angle of incidence θ3 from the optical glass block 62 to the silicon substrate 1 is about 62°.

The condition under which measuring light 64 reaching the silicon oxide film 61 is totally reflected is when the angle of incidence θ4R to the interface between the silicon oxide film 61 and the interior of the processing chamber is about 42° and when the angle of incidence θ4 from the optical glass block 62 to the silicon substrate 1 is about 36°. Therefore, measuring light having an angle of incidence of 36° to 62° reaches the silicon oxide 61 and is then totally reflected. Measuring light having an angle of incidence of greater than 62° is totally reflected between the silicon substrate 1 and the silicon oxide film 61.

In this embodiment, measuring light is irradiated so as to be incident at angles of incidence greater and smaller than the angle of incidence θ3 to the silicon substrate 1 as the boundary which is the angle θ3R at which total reflection starts occurring on the interface between the silicon substrate 1 and the silicon oxide film 61.

Incident light having an angle of incidence smaller than θ3 is incident up to the silicon oxide film 61 and is totally reflected. Incident light having an angle of incidence greater than θ3 is reflected on the interface between the silicon substrate 1 and the silicon oxide film 61. To obtain reflected light from both interfaces between the silicon substrate 1 and the silicon oxide film 61 and between the silicon oxide film 61 and the processing chamber, this embodiment furnishes the angle of incidence of measuring light with expansion so as to control the proportion of the quantity of measuring light having the angle of incidence greater than θ3 to the quantity of measuring light having the angle of incidence smaller than θ3. In this way, this embodiment optimizes the intensity change due to the interference of reflected light and can highly precisely measure the film thickness.

Since the basic principle of calculation of the film thickness is the same as that of calculation of the etching depth d described already, the detailed description will be omitted. Here, it will be assumed that the thickness of the silicon oxide film 61 is t, the reflecting angle on the interface between the silicon oxide film 61 and the interior of the processing chamber is β, the wavelength of measuring light is λ and refractive index of the silicon oxide film 61 is nsio. The increase of the thickness of the silicon oxide film 61 between the adjacent maximal and minimal values of the reflection intensity resulting from the interference is given by λ cos β/nsio. When the peak of the change of the reflected light intensity from the starting point of the film formation is discriminated, the thickness t of the resulting silicon oxide film 61 can be acquired.

The method that irradiates measuring light having a plurality of wavelengths, and calculates the film thickness from the change of the interference intensity for each wavelength is the same as that of the first embodiment, and its detailed description will be omitted. The method that reduces the influences of reflected light reflected from the interface between the silicon substrate 1 and the optical glass block 62 is based on the same principle that furnishes the angle of incidence with expansion and reduces the influences described with reference to FIG. 1. In the film measurement, the expansion of incident light is provided with the function of controlling the quantities of light reflected by both surfaces of the silicon oxide film 61 and the function of reducing the influences of surface reflected light.

FIG. 8 typically shows a construction of a practical film thickness measuring/monitoring apparatus according to the present invention. A lens 69, a shading plate 70, a stop 71, a suction block 72, a lens block 73 and a light projection/reception part 74 are assembled into a cylindrical holder 68. A light source 75 having a characteristic of irradiating infrared light having a wavelength of 1 to 3 microns and a spectroscopic detector 76 having a built-in infrared light sensor are connected to the light projection/reception part 74 through light guides 77a and 77b.

Measuring light irradiated from the light source 75, passing through the light guide 77a and emitted from the light projection/reception part 74 is converted by the lens 69 to parallel beams. The shading plate 70 and the stop 71 together create a cylindrical beam 78. This cylindrical beam 78 is condensed by the lens block 73 and is incident to the silicon substrate 1 in such a fashion as to form a focus on the surface of the silicon substrate 1. The angle of incidence of measuring light to the silicon substrate 1 is adjusted by changing a mean diameter [(outer diameter+inner diameter)/2] of the cylindrical beam 78. More concretely, the angle of incidence is adjusted by means of the shading plate 70 and the stop 71. Infrared ray irradiated to the silicon substrate 1 is incident to the light projection/reception part 74 through the opposite route to the incident route, passes through the light guide 77b and enters the spectroscope 76. The film thickness is calculated from the detection result in the same way as described in FIG. 7.

This embodiment has the function of measuring infrared light irradiated from the silicon substrate 1 and measuring the temperature of the substrate 1 besides the function of measuring the film thickness. Plasma and infrared light radiated from the opposing electrode pass through the silicon substrate 1 but only infrared ray having an angle of incidence falling within the range of angle smaller than the angle of incidence θ passes through the silicon substrate 1 from the total reflection condition shown in FIG. 7. The angle of incidence of measuring light to be totally reflected is set to an angle greater than the angle θ4 and the optical path of measuring light is completly isolated from infrared light radiated from plasma and the opposing electrode. The absorption block 72 absorbs plasma and infrared ray radiated from the opposing electrode.

Incidentally, the silicon substrate 1 radiates a dose of infrared light in accordance with its temperature. The problem with the temperature measurement of the silicon substrate 1 is that high precision temperature measurement cannot be made because infrared light transmits through the silicon substrate 1. In this embodiment, the region for detecting reflected light of measuring light is secured in a region in which plasma and infrared light irradiated from the opposing electrode do not pass. Accordingly, when the light source of measuring light is turned OFF, infrared light measured is only the one that is irradiated from the silicon substrate 1, and high precision temperature measurement can be conducted.

A flow path 79 of a coolant is formed in the cylindrical holder 68. Therefore, infrared light from the cylindrical holder 68 can be stabilized to a low level. FIG. 9 shows a schematic construction of a plasma CVD apparatus having the measuring/monitoring apparatus according to the present invention assembled therein. A stage electrode 81 and an opposing electrode 82 are disposed inside a processing chamber 80 of this plasma CVD apparatus. An insulating plate 83 electrically insulates the stage electrode 81 from the bottom surface, etc, of the processing chamber 80. A heater 84 for heating the substrate and the film thickness measuring apparatus 85 described with reference to FIG. 8 are assembled into the stage electrode 81. A radio frequency bias power source 86 applies a radio frequency voltage to the stage electrode 81 and controls ion energy incident to the processed substrate 1 at the time of generation of plasma.

A power source 87 supplies power to the heater 84 and can control the temperature of the stage electrode 81 from normal temperature to 400° C. A light source 88 and a detector 89 are connected to the film thickness measuring apparatus 85. A circulator 90 for causing the coolant to flow through the coolant flow path 79 of the holder 68 is further connected to the film thickness measuring apparatus 85. An insulating plate 91 electrically insulates the opposing electrode 82 from the upper surface, etc, of the processing chamber 80. A processing gas feed part 92 is disposed inside the opposing electrode 82. A radio frequency power source 93 is connected to the opposing electrode 82. When radio frequency power is supplied, plasma is generated between the stage electrode 81 and the opposing electrode 82. The processing gas feed part 92 supplies a processing gas at a set flow rate into the processing chamber 80. Exhaust is conducted from an exhaust port 94 and the pressure inside the processing chamber 80 is controlled to a set pressure.

Next, the operation of the embodiment shown in FIG. 9 will be described. The processing gas feed part 92 supplies a processing gas comprising a mixture of organic silane, oxygen and argon gas into the processing chamber 80. While the pressure is controlled to the set pressure, the radio frequency power source 93 supplies radio frequency power to the opposing electrode 82 to generate plasma. The processing gas is decomposed and a silicon oxide film is formed on the silicon substrate 1. The film thickness measuring apparatus 85 measurers the film thickness of the silicon oxide film thus formed. When the film thickness reaches the set thickness, the output of the radio frequency power source is turned OFF to stop discharge.

The film thickness measuring apparatus 85 further measures infrared light irradiated from the silicon substrate during the film formation processing and controls the output of the power source so that the temperature attains the set temperature. The film thickness measuring apparatus 86 evaluates film quality of the silicon oxide film during the film formation from the absorption characteristic of reflected infrared light. When film quality is not yet satisfactory, radio frequency bias power to be applied to the stage electrode 81 is controlled so that film falls within the set range.

In the film formation processing, too, a plurality of film thickness measuring/monitoring apparatuses are assembled in the same way as in the etching processing to measure the film thickness distribution during the film formation. The flow rate of the processing gas is controlled on the basis of this measurement result so that the film thickness distribution falls within the set condition.

As described above, the CVD apparatus according to this embodiment can measure the film thickness during the processing, and can moreover measure the film thickness stably and precisely without adhesion of the film to the measurement surface because the measurement surface is the back of the silicon substrate 1. The CVD apparatus can further measure the temperature of the silicon substrate 1 during the film formation as well as film quality of the film during the film formation, and can form the film under the set film quality and film thickness conditions.

Figure 10:
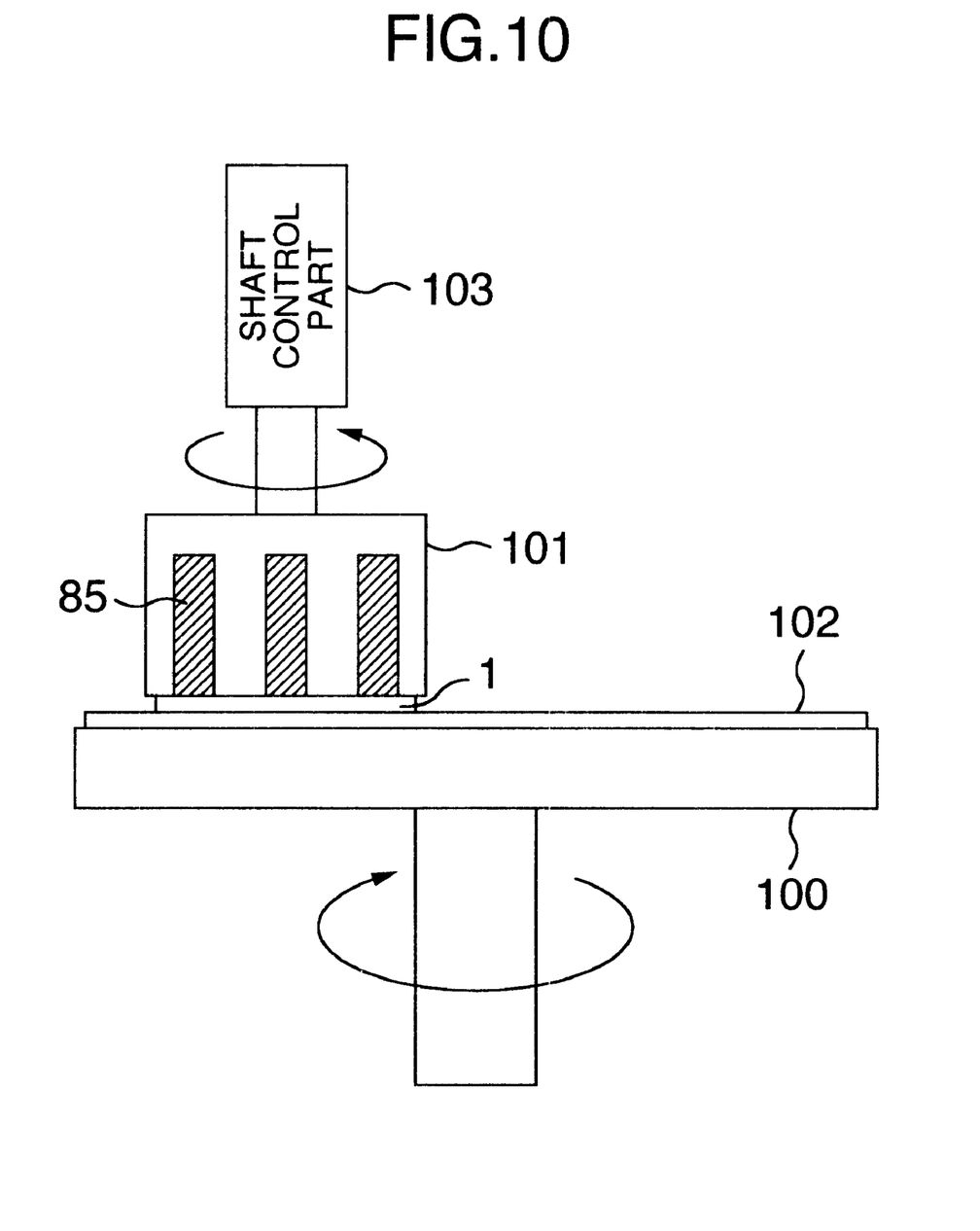
FIG. 10 is a structural view showing a section of a planarization/polishing apparatus having the film thickness measuring apparatus shown in FIG. 8 assembled therein.

Next, FIG. 10 shows an example of the application of the measuring/monitoring apparatus of the third embodiment to a planarization/polishing apparatus for planarizing and polishing the surface of a silicon oxide film formed on the surface of the silicon substrate 1. The principle of the film thickness measurement and the construction of the measuring/monitoring apparatus are the same as those of the embodiment shown in FIG. 8.

The planarization/polishing apparatus includes a lower turntable 100 and an upper turntable 101. A cloth 102 is bonded to the upper surface of the lower turntable 100. The lower turntable 100 and the upper turntable 101 are allowed to turn in the direction indicated by an arrow in the drawing by a driving mechanism, not shown. A shaft of the upper turntable 101 has a shaft control part 103 and can control polishing distribution of the silicon substrate 1. Means for vacuum adsorbing the back of the silicon substrate 1 and the film thickness measuring apparatus 85 are assembled into the upper turntable 101.

When adsorbed by the upper turntable 85, the back of the silicon substrate 1 comes into close contact with the measurement surface of the film thickness measuring apparatus 85. The film thickness measuring apparatus 85 is assembled into the upper turntable 101 at five positions, that is, one position at the center and four positions on the circumference.

While the silicon substrate 1 having the silicon oxide film formed on the surface thereof is adsorbed by the upper turntable 101, the film thickness measuring apparatus 85 measures the film thickness of the silicon oxide film formed on the silicon substrate 1. A lubricant is supplied from lubricant feed means, not shown, to the cloth 102. While both upper and lower turntables 101 and 100 are being rotated, the processed surface of the silicon substrate 1 is pushed to the cloth 102 to polish the silicon substrate 1. The film thickness measuring apparatus 85 continuously measures the film thickness, and calculates a polishing rate of the film and the remaining film thickness at each position on the substrate 1. The shaft control part 103 controls the push force of the upper turntable 101 to the cloth 3, the tilt of the shaft, etc, so that the silicon oxide film can be uniformly processed to the set film thickness.

As explained above, when the film thickness and the etching depth are measured, this embodiment can measure precisely and with high reproducibility the film thickness or the etching depth with scarce influences of the film formation and etching processing during the measurement. Although the foregoing embodiments have principally explained the silicon substrate 1, the present invention is not particularly limited to the silicon substrate 1. In other words, the present invention can be applied to the film formation and etching of liquid crystal display devices on a display glass substrate, the film formation and etching of magnetic heads and other devices using thin films. Needless to say, the wavelength of light employed must be selected in accordance with the substrate as the measurement object, film properties, and so forth.

The present invention can measure highly precisely and with high reproducibility the film thickness in the film formation and planarization processes, the etching depth in the etching process, and the substrate temperature in these processes. Because the present invention can thus fabricate highly precisely the fine patterns of the thin films into the set specification, the present invention can improve performance and reliability of semiconductor devices and liquid crystal display devices using the thin film fine patterns.

In other words, the present invention can accomplish a measuring/monitoring apparatus capable of measuring the film thickness and the etching depth without being affected by the condition of the progress of the process and by the condition inside the processing chamber, selectively detecting reflected light from the surface of the substrate the condition of which is to be measured, and highly precisely measuring the substrate surface.

What is claimed is:

1. A measuring apparatus comprising:
   irradiation means for irradiating measuring light from the back of a substrate such that said measuring light can be totally reflected from both first and second surfaces formed on the surface sides of the substrate; and
   measurement means for causing reflected lights of said measuring light irradiated by said irradiation means and reflected from said first and second surfaces to interfere with each other to thereby measure a distance between said first and second surfaces.

2. A measuring apparatus for measuring a film thickness of a film formed on a surface of a substrate or a depth of a processed surface processed on a substrate surface by optical interference means, comprising:
   irradiation means enabling irradiating of measuring light from the back of the substrate such that said measuring light incident on the substrate forms a plurality of incident angles and is totally reflected from an interface between a film formed on the substrate surface and the substrate and from a processed surface of the substrate or a film surface; and
   measurement means for measuring a film thickness or a processing depth by causing said reflected light from said interface and said reflected light from the processing surface or the film surface to interfere with each other.

3. A measuring apparatus according to claim 2, wherein said irradiation means enable irradiation of measuring light of a plurality of wavelengths, and said measurement means measures the film thickness of the processing depth from the interference result for each wavelength.

4. A measuring apparatus for measuring a film thickness of a film formed on a surface of a substrate or a depth of a processed surface processed on a substrate surface by optical interference means, comprising:
   irradiation means enabling irradiating of measuring light from the back of the substrate such that said measuring light is totally reflected from an interface between a film formed on the substrate surface and the substrate and from a processed surface of the substrate or a film surface; and
   measurement means for measuring a film thickness or a processing depth by causing said reflected light from said interface and said reflected light from the processing surface or the film surface to interfere with each other; wherein:

said irradiation means enables irradiation of irradiation light to the back of said substrate at different angles of incidence, and enables variation of the angle of incidence of said irradiation light so that an optical path difference of said irradiation light passing through said substrate is greater than a wavelength of incident light, and an optical path difference due to the film thickness of the film or the processing depth as an object of measurement is smaller than the wavelength of said incident light.

5. A measuring apparatus according to claim 4, wherein said irradiation means enables irradiation of irradiation light having a plurality of wavelengths, and said measuring means measures the film thickness or the processing depth from the interference result for each wavelength.

6. A measuring apparatus for measuring a film thickness of a film formed on a substrate surface by optical interference means, comprising:

means for irradiating from the back of the substrate which is a side of the substrate opposite to a side of the substrate surface on which the film is formed both measuring light under a condition where said measuring light is totally reflected on the surface of the film formed on the substrate surface, and measuring light under a condition where said measuring light is totally reflected by an interface between the film and the substrate; and means for measuring the film thickness by causing reflected light from the surface of the film and reflected light from the interface between the film and the substrate to interfere with each other.

7. A measuring apparatus according to claim 6, wherein said irradiation means enables irradiation of irradiation light having a plurality of wavelengths, and measures a film thickness or a processing depth from the interference result for each wavelength.

8. A thin film formation apparatus for forming a thin film on a substrate, comprising:

irradiation means for irradiating, from a back of a substrate, measuring light such that said measuring light incident on the substrate forms a plurality of incident angles and is totally reflected by an interface between a film formed on a substrate surface and the substrate;

measurement means for measuring a film thickness by causing reflected light from the interface and reflected light from a surface of the film to interfere with each other; and means for forming a thin film on the substrate by feeding back the film thickness measured by said measurement means.

9. A processing apparatus of a substrate surface, comprising:

means for irradiating measuring light from a back of a substrate such that said measuring light is totally reflected from both a substrate surface and a processed surface of the substrate;

means for measuring a processing depth by causing reflected light from the substrate surface and reflected light from the processing surface to interfere with each other; and means for processing the substrate surface on the basis of the processing depth measured by said means for measuring the processing depth.

10. A method of forming a thin film, comprising the steps of:

irradiating measuring light from a back of a substrate which is a side of the substrate opposite to a side of a substrate surface on which a film is formed such that said measuring light is totally reflected from an interface between the film formed on the substrate surface and the substrate;

causing reflected light from the interface and reflected light from the surface of the film to interfere with each other, and thereby measuring the film thickness;

calculating a difference between the film thickness so measured and a target value of a film thickness set in advance; and controlling a processing condition of film formation on the basis of the difference.

11. A method of processing a substrate surface, comprising the steps of:

irradiating from a back of a substrate measuring light such that said measuring light is totally reflected from a substrate surface and from a processed surface formed on the same side as the substrate surface;

causing reflected light from the substrate surface and reflected light from the processed surface to interfere with each other, and thereby measuring a processing depth;

calculating a difference between a processing depth so measured and a target value of a processing depth set in advance; and controlling a processing condition of the substrate surface on the basis of the difference.

12. An apparatus for measuring a temperature, including measurement means for measuring an intensity of infrared ray irradiated from a back of a substrate, and measuring the intensity of infrared ray irradiated from the substrate to measure a temperature of the substrate, wherein the measuring light is irradiated from the back of the substrate which is a side of the substrate opposite to a side of a substrate surface on which a film is formed, the measurement range of infrared light by said measurement means for measuring the intensity of irradiated infrared light is set to a region outside an optical path region through which irradiated infrared light generated from an irradiated infrared light generation range other than the substrate as a measurement object passes.

13. A measuring apparatus according to claim 2, wherein said measuring means provides an output of the film thickness so as to control formation of a thin film on the substrate in accordance therewith.

14. A measuring apparatus according to claim 2, wherein said measuring means provides an output of the measured processing depth so as to control processing of the substrate surface on the basis of the measured processing depth.

15. A measuring apparatus according to claim 1, wherein the first and second surfaces are formed on the same side of the substrate which is opposite to the side of the back of the substrate.

16. A measuring apparatus according to claim 1, wherein an optical glass structure is disposed on a side of the back of the substrate.

17. A measuring apparatus according to claim 16, wherein said measuring light passes through said optical glass structure.

18. A thin film formation apparatus according to claim 8, wherein the substrate is disposed on a substrate installing mount and said measurement means is at least partially formed in said substrate installing mount.

* * * * *